United States Patent
Sonoo

(10) Patent No.: US 9,903,208 B2
(45) Date of Patent: Feb. 27, 2018

(54) TURBINE BLADE MACHINING METHOD, MACHINING TOOL, AND TURBINE BLADE

(71) Applicant: MITSUBISHI HITACHI POWER SYSTEMS, LTD., Kanagawa (JP)

(72) Inventor: Tomomi Sonoo, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 203 days.

(21) Appl. No.: 14/762,062

(22) PCT Filed: Feb. 12, 2014

(86) PCT No.: PCT/JP2014/053196
§ 371 (c)(1),
(2) Date: Jul. 20, 2015

(87) PCT Pub. No.: WO2014/132797
PCT Pub. Date: Sep. 4, 2014

(65) Prior Publication Data
US 2015/0354371 A1 Dec. 10, 2015

(30) Foreign Application Priority Data

Feb. 26, 2013 (JP) .................................. 2013-036458

(51) Int. Cl.
*F01D 5/18* (2006.01)
*F01D 5/28* (2006.01)
(Continued)

(52) U.S. Cl.
CPC .............. *F01D 5/186* (2013.01); *B23P 6/002* (2013.01); *B24B 1/04* (2013.01); *B24B 19/14* (2013.01);
(Continued)

(58) Field of Classification Search
CPC .. C23C 4/18; C23C 4/185; C23C 4/01; F01D 5/186; F01D 5/288; F01D 5/005;
(Continued)

(56) References Cited

U.S. PATENT DOCUMENTS 4,743,462 A * 5/1988 Radzavich ................ C23C 4/02
427/282
5,216,808 A * 6/1993 Martus ................. B23K 26/032
29/889.1
(Continued)

FOREIGN PATENT DOCUMENTS

JP 61-144947 9/1986
JP 61144947 U * 9/1986
(Continued)

OTHER PUBLICATIONS

Written Opinion of the International Searching Authority dated Apr. 28, 2014 in International (PCT) Application No. PCT/JP2014/053196, with English translation.
(Continued)

*Primary Examiner* — Mark Laurenzi
*Assistant Examiner* — Xiaoting Hu
(74) *Attorney, Agent, or Firm* — Wenderoth, Lind & Ponack, L.L.P.

(57) ABSTRACT

A turbine blade machining method and a machining tool, which allow efficient machining of a through-hole running from the surface of a turbine blade to the interior thereof, and a turbine blade. This turbine blade machining method, in which a through-hole is machined in a turbine blade with a protective film formed on a surface of a substrate, has: an insertion step of inserting a machining tool, including a grinding region provided at a tip thereof, into the through-hole with such an orientation that the grinding region faces the surface of the through-hole; and a removal step of
(Continued)

grinding the protective film laminated in the through-hole with the grinding region of the machining tool inserted into the through-hole, to remove the protective film laminated in the through-hole.

15 Claims, 13 Drawing Sheets

(51) Int. Cl.
*B23P 6/00* (2006.01)
*B24B 19/14* (2006.01)
*C23C 4/18* (2006.01)
*F01D 5/00* (2006.01)
*B24B 1/04* (2006.01)

(52) U.S. Cl.
CPC .............. *C23C 4/18* (2013.01); *F01D 5/005* (2013.01); *F01D 5/288* (2013.01); *B23P 2700/06* (2013.01); *F05D 2220/30* (2013.01); *F05D 2230/10* (2013.01); *F05D 2230/311* (2013.01); *F05D 2230/90* (2013.01); *F05D 2260/202* (2013.01)

(58) Field of Classification Search
CPC ........... F05D 2260/202; F05D 2230/10; F05D 2230/14; F05D 2230/90; F05D 2230/31–2230/314; B24B 19/14; B24B 1/04; B24B 27/06; B24B 27/0641; B23P 2700/06; B23P 6/002
See application file for complete search history.

(56) References Cited

U.S. PATENT DOCUMENTS

| | | | | |
|---|---|---|---|---|
| 5,702,288 | A * | 12/1997 | Liebke | B24B 31/116 451/113 |
| 5,902,647 | A * | 5/1999 | Venkataramani | B05D 1/32 427/142 |
| 6,004,620 | A * | 12/1999 | Camm | B23P 6/002 427/142 |
| 6,042,879 | A * | 3/2000 | Draghi | C23C 4/02 29/889.1 |
| 6,265,022 | B1 * | 7/2001 | Fernihough | F01D 5/28 29/889.1 |
| 6,333,069 | B1 * | 12/2001 | Beeck | C23C 4/01 427/140 |
| 6,544,346 | B1 * | 4/2003 | Grossklaus, Jr. | B22D 29/002 134/22.17 |
| 2003/0037436 | A1 * | 2/2003 | Ducotey, Jr. | B23H 9/10 29/889.1 |
| 2003/0165621 | A1 * | 9/2003 | Farmer | B23P 6/002 427/331 |
| 2004/0096318 | A1 | 5/2004 | Ohara et al. | |
| 2005/0084657 | A1 * | 4/2005 | Ohara | C23C 4/02 428/195.1 |
| 2005/0100672 | A1 * | 5/2005 | Stankowski | F01D 5/00 427/282 |
| 2005/0126001 | A1 * | 6/2005 | Hanley | B23P 6/002 29/889.1 |
| 2005/0215686 | A1 * | 9/2005 | Fernihough | C23C 8/04 524/430 |
| 2007/0087117 | A1 * | 4/2007 | Jabado | C23C 14/042 427/97.7 |
| 2008/0006301 | A1 * | 1/2008 | Garry | B08B 3/024 134/22.18 |
| 2008/0085395 | A1 * | 4/2008 | Fernihough | F01D 5/005 428/131 |
| 2009/0142548 | A1 * | 6/2009 | Patterson | C23C 4/02 428/137 |
| 2009/0220349 | A1 | 9/2009 | Bolms et al. | |
| 2012/0084981 | A1 * | 4/2012 | Arikawa | F01D 5/288 29/889.721 |
| 2012/0167389 | A1 * | 7/2012 | Lacy | B23P 6/002 29/889.1 |
| 2012/0184184 | A1 * | 7/2012 | Grosbois | B24B 1/04 451/37 |
| 2013/0206739 | A1 * | 8/2013 | Reed | F01D 25/12 219/121.71 |
| 2013/0269354 | A1 * | 10/2013 | Starkweather | F23R 3/06 60/754 |
| 2014/0202498 | A1 * | 7/2014 | Bellino | C23C 4/185 134/22.12 |

FOREIGN PATENT DOCUMENTS

| | | |
|---|---|---|
| JP | 63-216676 | 9/1988 |
| JP | 3-234451 | 10/1991 |
| JP | 4-30956 | 2/1992 |
| JP | 10-89005 | 4/1998 |
| JP | 2002-105666 | 4/2002 |
| JP | 2002-256808 | 9/2002 |
| JP | 2009-510302 | 3/2009 |
| JP | 2011-64207 | 3/2011 |
| JP | 2012-82700 | 4/2012 |
| JP | 2012-140952 | 7/2012 |

OTHER PUBLICATIONS

International Search Report dated Apr. 28, 2014 in International (PCT) Application No. PCT/JP2014/053196, with English translation.

Decision of a Patent Grant dated Dec. 10, 2013 in Japanese Application No. 2013-036458, with English translation.

Notice for the Grant of Invention Patent Right and Notification of Completion of Formalities for Registration dated Sep. 27, 2016 in Chinese Application No. 201480005848.1, with English translations thereof.

* cited by examiner

TURBINE BLADE MACHINING METHOD, MACHINING TOOL, AND TURBINE BLADE

TECHNICAL FIELD

The present invention relates to a machining method of a turbine blade in which a through-hole is formed, to a machining tool and to a turbine blade machined by the machining method or with the machining tool.

BACKGROUND ART

In a gas turbine, steam turbine, and the like, turbine stationary blades and turbine rotating blades are arranged in a pathway along which a fluid (combustion gas or vapor) flows. The stationary blades are supported by a member on a fixed side such as a casing, and the turbine rotating blades are supported by a member on a rotating side such as a rotating shaft.

Turbine blades, including the turbine stationary blade and the turbine rotating blade, may be provided with a through-hole connecting the surface of the turbine blade to an interior space thereof. The through-hole is, for example, a film cooling hole performing film cooling of the turbine blade by discharging cooling air from the interior.

Various methods have been proposed as a method to form the through-hole in the turbine blade (a turbine blade machining method) (refer to Patent Documents 1 and 2). For example, Patent Document 1 discloses a method including applying a bond coating to a blade base material, drilling film cooling holes, forming a top coat, and removing the top coat of a region including a row of the cooling holes by air blasting or water jet. Furthermore, Patent Document 2 discloses a method including applying a thermal barrier coating to metal components of a gas turbine engine having a cooling hole formed of a metering hole, a cooling hole outlet, and a trough part, and removing the coating adhering to the metering hole first by water jet or laser and then removing the coating adhering to the cooling hole outlet and removing finally the coating of the trough part.

CITATION LIST

Patent Documents

Patent Document 1: Japanese Unexamined Patent Application Publication No. 2012-82700A
Patent Document 2: Japanese Unexamined Patent Application Publication No. 2012-140952A

SUMMARY OF INVENTION

Technical Problem

As described in Patent Documents 1 and 2, in the turbine blade, a protective film (a film improving a heat resistance function, for example) is laminated by thermal spraying or the like on the surface of a substrate (base material) in which a through-hole is formed, and a portion of the protective film laminated on the through-hole or a portion thereof entering inside the through-hole, or the like is removed so that the through-hole is not blocked by the protective film. Here, in Patent Documents 1 and 2, the protective film having an impact on the through-hole is removed by air blasting, water jet, or laser.

However, when air blasting or water jet is used, it is necessary to use a mask (a shielding plate) with a pattern of the through-holes formed thereon to enable the through-holes to be machined, or it is necessary to adjust machining conditions so that an impact on the substrate is suppressed. Furthermore, if a force imparted at the time of machining is reduced, it takes longer to perform the machining, and if the force imparted at the time of machining is increased, there is an increased risk of causing an impact on the substrate. In addition, when a laser is used, the establishment of machining conditions conforming to the shape of the through-hole is difficult, and there are limits on improving the efficiency of the machining.

In light of the foregoing problems, an object of the present invention is to provide a turbine blade machining method and a machining tool, which allow efficient machining of a through-hole running from the surface of the turbine blade to the interior thereof, and a turbine blade.

Solution to Problem

A turbine blade machining method of the present invention to achieve the above-described object is a turbine blade machining method of machining a through-hole of the turbine blade, a protective film being formed on a surface of a substrate of the turbine blade. The machining method includes an insertion step of inserting a machining tool, including a grinding region provided at a tip thereof, into the through-hole with such an orientation that the grinding region faces the surface of the through-hole, and a removal step of grinding the protective film laminated in the through-hole with the grinding region of the machining tool inserted into the through-hole, to remove the protective film laminated in the through-hole.

Thus, by inserting the machining tool provided with the grinding region into the through-hole and grinding to remove the protective film overlapping the through-hole, it is possible to selectively remove the protective film overlapping the through-hole. Furthermore, by removing the protective film by grinding with the machining tool, it is possible to perform the operation while checking the state of removal of the protective film and it is thus possible to efficiently perform the machining. In this manner, the through-hole running from the surface of the turbine blade to the interior thereof can be machined efficiently.

In the turbine blade machining method of the present invention, the grinding region of the machining tool has a shape conforming to a shape of the through-hole as seen from the surface of the substrate.

Thus, as the grinding region of the machining tool has the shape conforming to the shape of the through-hole, it is possible to perform the machining while protecting the substrate of the through-hole. Furthermore, it is possible to efficiently remove the protective film overlapping the through-hole.

In the turbine blade machining method of the present invention, the grinding region of the machining tool is formed on at least one surface of a pyramid shape tapered toward a tip.

Thus, it is possible to make the grinding region a flat surface becoming narrower toward the tip thereof, and it is possible to inhibit a portion of the grinding region from coming into contact with the substrate of the through-hole and a groove or the like from being formed. In this manner, the machining can be easily performed while protecting the through-hole.

In the turbine blade machining method of the present invention, the removal step includes grinding the protective film with the grinding region by oscillating the machining tool with an oscillating portion.

Thus, by oscillating with the oscillating portion, the grinding process can be efficiently executed.

In the turbine blade machining method of the present invention, the oscillating portion reciprocates the grinding region in a direction of insertion into the through-hole.

Thus, by reciprocating the grinding region in the direction of insertion into the through-hole, it is possible to perform the machining while protecting the substrate or the like of the through-hole.

The turbine blade machining method of the present invention further includes a pretreatment step of, before the insertion step, inserting a rod-shaped machining tool, including a rod-shaped grinding region provided at the tip thereof, into the through-hole with such an orientation that the grinding region faces the surface of the through-hole, and grinding the protective film by bringing the grinding region of the machining tool inserted into the through-hole into contact with the protective film while rotating the grinding region to remove a portion of the protective film laminated in the through-hole.

Thus, by removing a portion of the protective film before the insertion step, it is possible to efficiently remove the protective film.

The turbine blade machining method of the present invention further includes a post-treatment step of, after the removal step, inserting a rod-shaped machining tool, including a rod-shaped grinding region provided at the tip thereof, into the through-hole with such an orientation that the grinding region faces the surface of the through-hole, and grinding the protective film laminated in the through-hole with the grinding region of the machining tool inserted into the through-hole to remove the protective film laminated in the through-hole.

Thus, by the post-treatment step, it is possible to suitably remove the protective film even when the protective film has remained in the through-hole.

In the turbine blade machining method of the present invention, the protective film is formed on the surface of the substrate by thermal spraying Thus, the protective film formed by thermal spraying can be suitably removed.

In the turbine blade machining method of the present invention, diamond particles are bonded to the grinding region of the machining tool.

Thus, the protective film can be suitably removed.

A machining tool of the present invention to achieve the above-described object includes a tip portion provided with at least one grinding surface, a grinding region formed thereon having diamond particles bonded to the grinding region, and a support portion connected to one end of the tip portion. The grinding surface has a width that becomes narrower toward the tip portion, the tip portion being an end on the opposite side to the end supported by the support portion.

Thus, it is possible to bring the grinding surface into contact with the through-hole in a suitable manner to grind easily. In this manner, the through-hole running from the surface of the turbine blade to the interior thereof can be machined efficiently.

In the machining tool of the present invention, a cross-section of the grinding surface has a linear shape, the cross-section being orthogonal to a direction connecting the end supported by the support portion and the tip portion.

Thus, by making the grinding surface a flat surface, it is possible to suitably remove the protective film laminated in the through-hole in which a flat surface is formed.

In the machining tool of the present invention, a cross-section of the grinding surface has an inwardly-convex curved shape, the cross-section being orthogonal to a direction connecting the end supported by the support portion and the tip portion.

Thus, by making the grinding surface an inwardly-convex curved surface, it is possible to suitably remove the protective film laminated in the through-hole in which a curved surface swelling outward is formed.

The machining tool of the present invention further includes an oscillating portion connected to the support portion, the oscillating portion, via the support portion, reciprocating the tip portion in a direction in which the end supported by the support portion and the tip portion are connected.

Thus, by reciprocating in the direction in which the end supported by the support portion and the tip portion are connected, it is possible to perform the machining while protecting the substrate or the like of the through-hole in an object to be machined.

A turbine blade of the present invention to achieve the above-described object has a through-hole machined therein by the turbine blade machining method according to any one of the above aspects.

Thus, it is possible to form the through-hole with a more accurate shape and it is possible to further improve the performance of the turbine blade.

A turbine blade of the present invention to achieve the above-described object has a through-hole machined therein with the machining tool according to any one of the above aspects.

Thus, it is possible to form the through-hole with a more accurate shape and it is possible to further improve the performance of the turbine blade.

Advantageous Effects of Invention

According to the turbine blade machining method and the machining tool of the present invention, the through-hole running from the surface of the turbine blade to the interior thereof can be machined efficiently. According to the turbine blade of the present invention, it is possible to form the through-hole with a more accurate shape and it is possible to further improve the performance of the turbine blade.

DESCRIPTION OF EMBODIMENTS

Preferred embodiments of a machining method and a machining tool of a turbine blade according to the present invention are described in detail below with reference to the accompanying drawings. Note that the present invention is not limited by the embodiment, and when a plurality of embodiments are present, the present invention is intended to include a configuration combining these embodiments.

Embodiments

Figure 1:
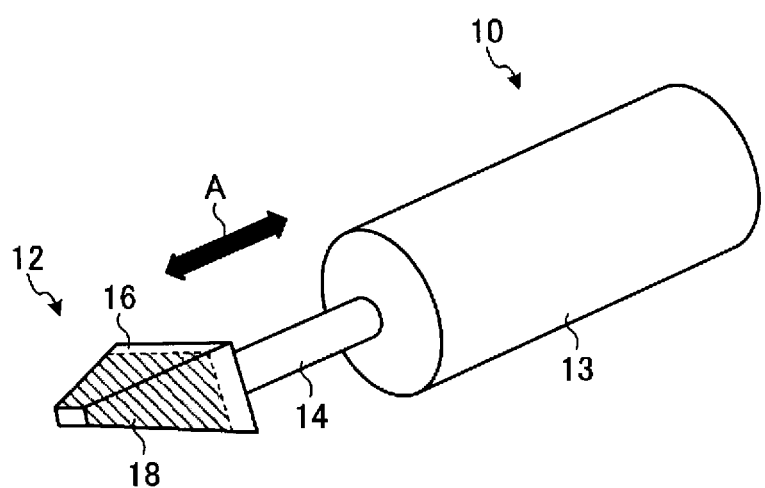
FIG. 1 is a perspective view illustrating a schematic configuration of a machining tool according to a present embodiment.
Figure 2A:
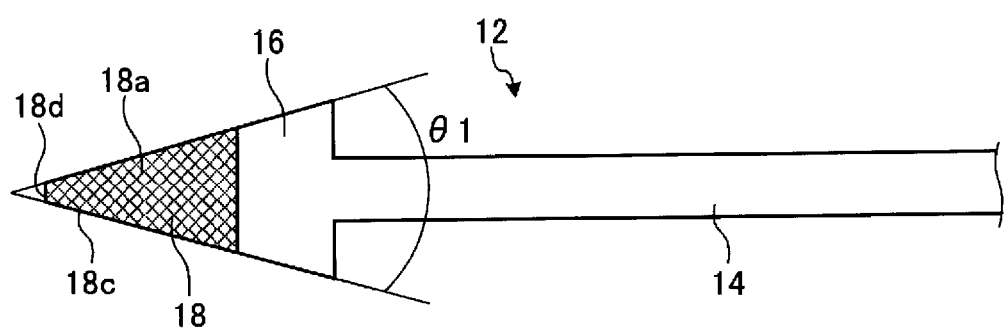
FIG. 2A is a top view illustrating a schematic configuration of a tool main body.
Figure 2B:
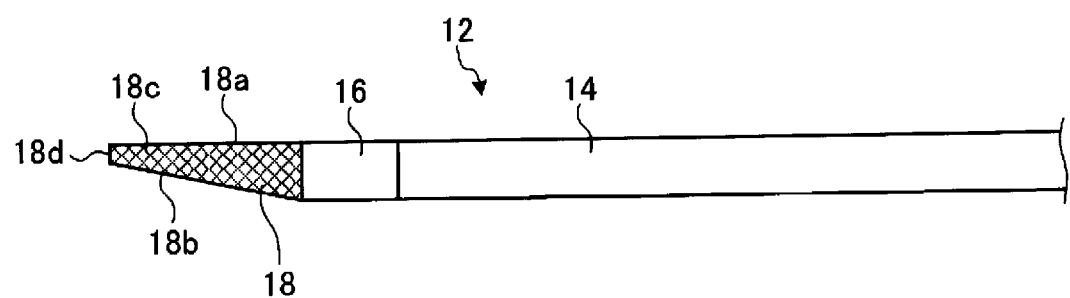
FIG. 2B is a side view illustrating a schematic configuration of the tool main body illustrated in FIG. 2A.
Figure 2C:
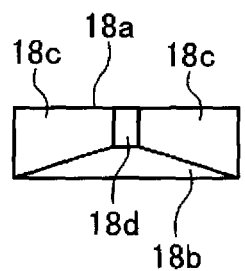
FIG. 2C is a front view illustrating a schematic configuration of the tool main body illustrated in FIG. 2A.

FIG. 1 is a perspective view illustrating a schematic configuration of a machining tool according to the present embodiment. FIG. 2A is a top view illustrating a schematic configuration of a tool main body. FIG. 2B is a side view illustrating a schematic configuration of the tool main body illustrated in FIG. 2A. FIG. 2C is a front view illustrating a schematic configuration of the tool main body illustrated in FIG. 2A. A machining tool 10 includes a tool main body 12 and an oscillating portion 13.

As illustrated in FIG. 1 and FIG. 2A to FIG. 2C, the tool main body 12 includes a support portion 14 and a tip portion 16 fixed to one end of the support portion 14. The support portion 14 is a rod-shaped member and the end of the support portion 14 to which the tip portion 16 is not fixed is mounted on the oscillating portion 13. The tip portion 16 has a shape of which the cross-section becomes smaller toward the tip thereof, namely from a portion connected to the support portion 14 toward the end on the other side thereof.

A predetermined range on the tip side of the tip portion 16 is a grinding region 18. Diamond particles are bonded to the surface of the grinding region 18. The diamond particles are bonded to the tip portion 16 by electrodeposition or the like. The grinding region 18 of the tip portion 16 has a square pyramid shape. Note that, more accurately, the tip portion 16 of the present embodiment has a shape in which the tip of a square pyramid has been cut away, namely, a shape in which the tip is a surface. Accordingly, the grinding region 18 also has a shape of which the cross-section becomes smaller toward the tip thereof, namely from the portion connected to the support portion 14 toward the end on the other side thereof. One surface of the grinding region 18 having the largest area is a top surface 18a and a surface on the opposite side of the top surface 18a is a bottom surface 18b. Surfaces of the grinding region 18 sandwiched between the top surface 18a and the bottom surface 18b and extending in an extending direction of the support portion 14 are side surfaces 18c and a tip surface is a tip 18d. As illustrated in FIG. 2A, the grinding region 18 of the present embodiment has a trapezoidal shape in which a width of the top surface 18a and the bottom surface 18b becomes narrower toward the tip 18d. The top surface 18a and the bottom surface 18b have an isosceles trapezoidal shape, and an angle formed by oblique sides thereof is θ1. The top surface 18a is a surface parallel to the extending direction of the support portion 14, and the bottom surface 18b is a surface inclining at a predetermined angle with respect to the extending direction of the support portion 14. In this way, an interval between the top surface 18a and the bottom surface 18b becomes wider as the distance from the tip 18d increases. Furthermore, a cross-section of each of the top surface 18a and the bottom surface 18b orthogonal to the extending direction of the support portion 14 forms a linear flat surface (plane).

The oscillating portion 13 is a device that oscillates the tool main body 12 in the extending direction (the direction of an arrow A). The extending direction is the direction in which the support portion 14 extends and is the direction in which the tip of the tip portion 16 (the narrow section of the tip portion 16 on the opposite side to the end connected to the support portion 14) and the end thereof connected to the support portion 14 are connected. A variety of drive sources can be used as the oscillating portion 13, and, for example, an oscillation source of an electric grinder (a machine that electrically reciprocating a machining tool) or an ultrasonic wave grinder can be used.

The machining tool 10 has the above-described configuration and the grinding region 18 is formed on the tip side of the tip portion 16 of the tool main body 12. An object to be ground can be ground by bringing the grinding region 18 into contact with and sliding it against the object to be ground. Here, of the grinding region 18 of the present embodiment, mainly the bottom surface 18b is the surface brought into contact with the object to be ground, namely, a grinding surface.

Furthermore, in the machining tool 10, since the bottom surface 18b that is the grinding surface of the grinding region 18 has a shape in which its width becomes wider as the distance from the tip 18d increases, namely, it has a tapered shape, and since the bottom surface 18b is a plane (a flat surface in the present embodiment), tip 18d is narrow and the machining tool 10 can suitably machine an object to be machined having a flat surface shape. In addition, as the machining tool 10 can suitably perform machining with the grinding surface, it is also possible to lengthen the life of the tool.

Furthermore, the machining tool 10 uses the oscillating portion 13 to oscillate the tool main body 12 in the extending direction, and can thus oscillate the grinding region 18 in the extending direction. The machining tool 10 uses the oscillating portion 13 to oscillate the grinding region 18 in the extending direction while the grinding region 18 is brought into contact with the object to be ground, and can thus suitably oscillate the grinding region 18 with respect to the object to be ground. In this manner, the grinding can be carried out efficiently. In addition, as the oscillating portion 13 oscillates the grinding region 18 in the extending direction, when the object to be ground has a shape tapering toward a tip, it is possible to inhibit the grinding region 18 from coming into contact with side walls and the like of the object to be ground.

Figure 3A:
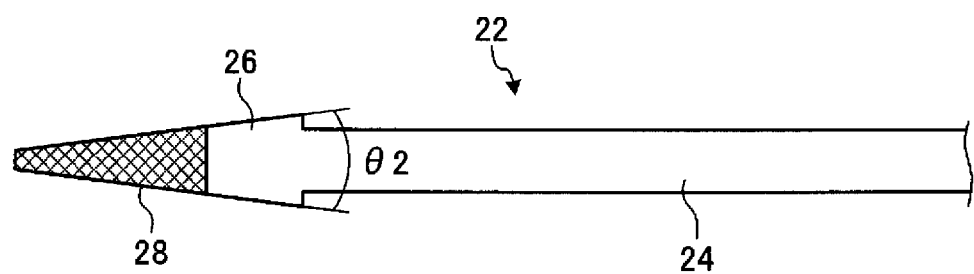
FIG. 3A is a top view illustrating a schematic configuration of a tool main body of a variation.
Figure 3B:
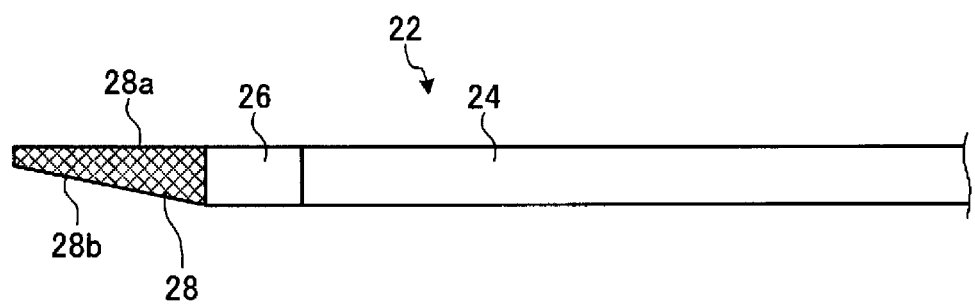
FIG. 3B is a side view illustrating a schematic configuration of the tool main body illustrated in FIG. 3A.

Here, the shape of the tool main body 12 of the machining tool 10, more specifically, the shape of the grinding surface of the grinding region 18, is not limited to the above example. It is sufficient that the grinding surface have a tapered shape and be a surface. FIG. 3A is a top view illustrating a schematic configuration of a tool main body of a variation. FIG. 3B is a side view illustrating a schematic configuration of the tool main body illustrated in FIG. 3A.

A tool main body 22 illustrated in FIG. 3A and FIG. 3B includes a support portion 24 and a tip portion 26. A grinding region 28 is provided on the tip portion 26. The grinding region 28 illustrated in FIG. 3A and FIG. 3B has a trapezoidal shape in which a width of a top surface 28a and a bottom surface 28b (the grinding surface) becomes narrower toward a tip. Furthermore, the top surface 28a and the bottom surface 28b have an isosceles trapezoidal shape and an angle formed by oblique sides thereof is θ2. Here, θ2 is an angle smaller than θ1. In this manner, the machining tool 10 can have various angles as the angle of the tapered shape of the grinding surface. For example, when θ1 is 30 degrees and θ2 is 15 degrees, it is possible to use either of the tool main bodies 12 and 22 to suitably machine the object to be machined.

Figure 4:
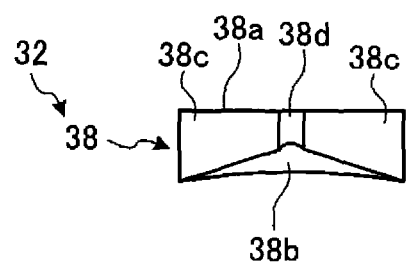
FIG. 4 is a front view illustrating a schematic configuration of a tool main body according to a variation.

Next, FIG. 4 is a front view illustrating a schematic configuration of a tool main body of a variation. Of a grinding region 38 of a tool main body 32 illustrated in FIG. 4, a top surface 38a, side surfaces 38c, and a tip portion 38d are formed by flat surfaces. Furthermore, a cross-section of the bottom surface 38b of the grinding region 38 orthogonal to the extending direction (a cross-section orthogonal to the direction in which the end supported by a support portion and the tip portion are connected) has an inwardly-convex curved shape. In this manner, in the tool main body 32, the bottom surface 38b, namely, the grinding surface, may have a curved surface shape. By having an inwardly-convex curved surface shape in this manner, it is possible to suitably grind an object to be machined formed with a curved surface swelling outward.

Furthermore, in the present embodiment, in order to make the grinding surface plane, the tip portion 16 (the grinding region 18) has the square pyramid shape or the square pyramid shape in which one surface is the curved surface, but the shape is not limited to these examples. For example, it is possible to form the grinding surface by making the tip portion 16 (the grinding region) 18 a polygonal pyramid, such as a triangular pyramid or a hexagonal pyramid. Note that with the square pyramid, it is possible to reduce the impact on the side walls of the object to be machined.

Furthermore, with the oscillating portion 13 oscillating the tool main body 12 in the extending direction, the machining tool 10 of the present embodiment can perform suitable machining, as described above, but the machining tool 10 is not limited to this example. The machining tool 10 may oscillate the tool main body 12 in a direction orthogonal to the extending direction, or may rotate the tool main body 12. In addition, oscillation in a variety of directions may be combined. Furthermore, the machining tool 10 does not have to be provided with a drive source oscillating the tool main body 12. Specifically, the grinding region 18 may be manually slid with respect to the object to be machined.

Furthermore, the machining tool 10 can suitably machine a through-hole of a turbine blade, such as a film cooling hole, for example. More specifically, when creating the turbine blade provided with the through-hole, the machining tool 10 can be suitably used in processing to remove a protective film formed on a portion overlapping the through-hole or a protective film formed inside the through-hole, after the protective film, for example, a thermal barrier coating (TBC), which is a high-performance thermal barrier coating for gas turbines, is formed on the surface of the substrate of the turbine blade.

Next, with reference to FIG. 5 to FIG. 8, a machining method of a turbine blade will be described.

Figure 5:
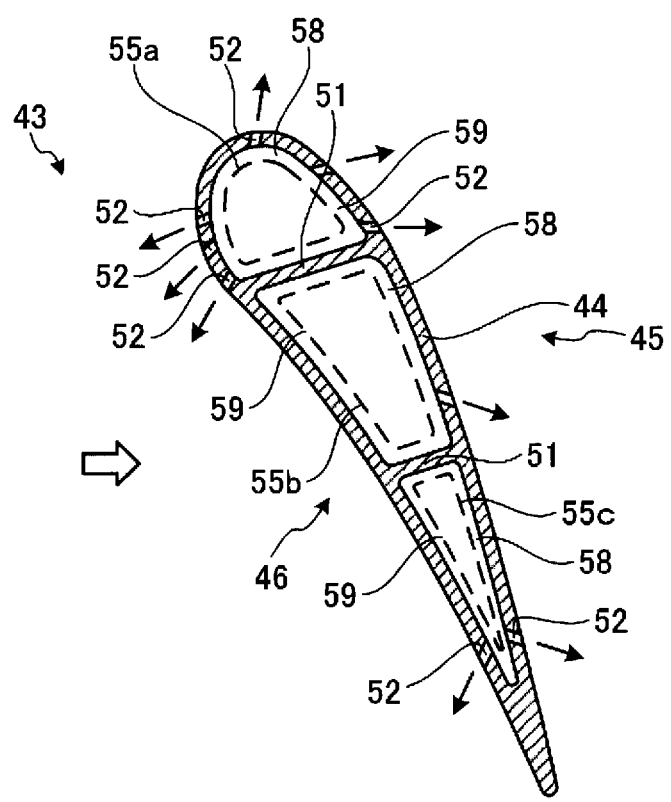
FIG. 5 is a lateral cross-sectional view illustrating a schematic configuration of an exemplary turbine stationary blade.
Figure 6A:
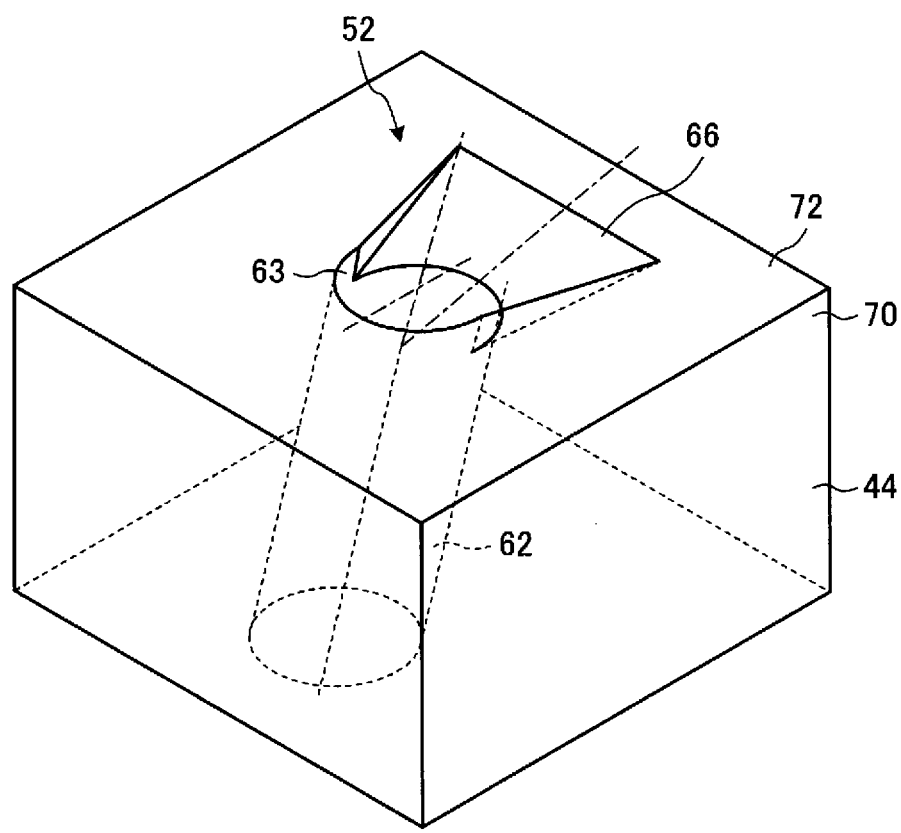
FIG. 6A is a perspective view illustrating a schematic configuration of a cooling hole of the turbine stationary blade illustrated in FIG. 5.
Figure 6B:
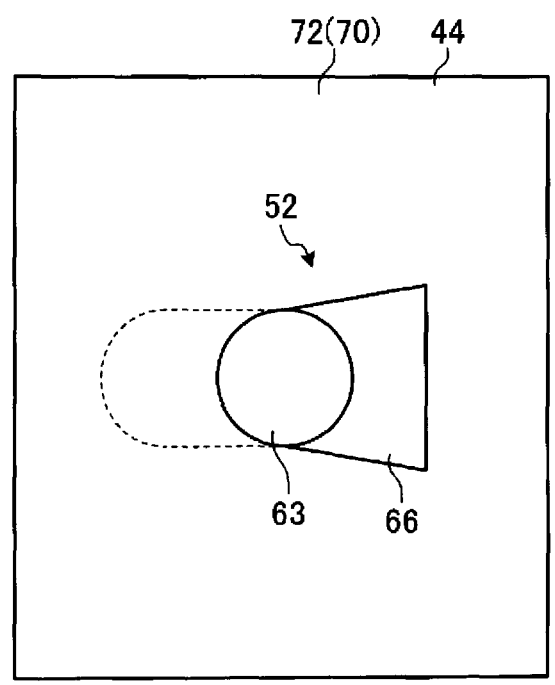
FIG. 6B is a front view illustrating a schematic configuration of the cooling hole illustrated in FIG. 6A.
Figure 6C:
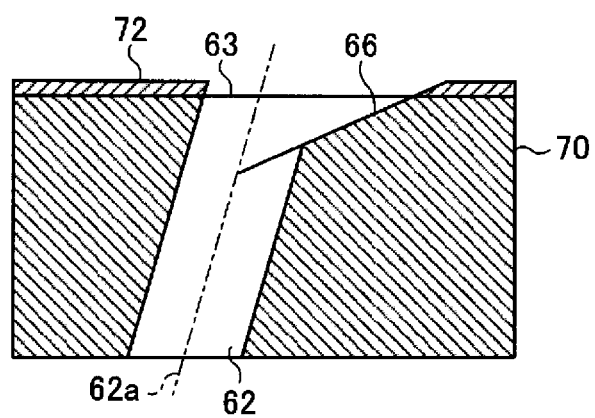
FIG. 6C is a cross-sectional view illustrating a schematic configuration of the cooling hole illustrated in FIG. 6A.

First, a through-hole of the turbine blade, which is the object to be machined, will be described with reference to FIG. 5 and FIG. 6A to FIG. 6C. FIG. 5 is a cross-sectional view illustrating a schematic configuration of an example of a turbine stationary blade. FIG. 6A is a perspective view illustrating a schematic configuration of a cooling hole of the turbine stationary blade illustrated in FIG. 5. FIG. 6B is a front view illustrating a schematic configuration of the cooling hole illustrated in FIG. 6A. FIG. 6C is a cross-sectional view illustrating a schematic configuration of the cooling hole illustrated in FIG. 6A. Note that, hereinafter, although the cooling hole provided in the turbine stationary blade will be described, the same description applies also to the turbine rotating blade. In other words, the turbine blade refers to both the turbine stationary blade and the turbine rotating blade.

A turbine stationary blade 43 includes a blade main body (a blade structural portion) 44. In a longitudinal direction (a radial direction of a rotor) of the blade main body 44, an outer shroud (an end wall structural portion) is fixed to one end (the outside in the radial direction) of the blade main body 44, and an inner shroud (an end wall structural portion) is fixed to the other end (the inside in the radial direction) of the blade main body 44.

The blade main body 44 forms a hollow shape, having a curved cross-sectional shape on the upstream side (the left side in FIG. 5) in a flow direction of combustion gas, and having a tapered cross-sectional shape on the downstream side (the right side in FIG. 5) in the flow direction of the combustion gas. The interior of the blade main body 44 is partitioned into three spaces by two partition walls 51. Furthermore, a plurality of cooling holes 52 that each penetrate the interior and the exterior are formed in the blade main body 44 at predetermined positions.

Partition plates 55a, 55b, and 55c are fixed to the inside of the blade main body 44. The partition plates 55a, 55b, and 55c have a cylindrical shape and their ends at the side of the shrouds have an expanded diameter and are fixed to the shrouds. By the partition plates 55a, 55b, and 55c being fixed to the inside of the blade main body 44, a cavity 58 is formed in a partitioned manner. A large number of through-holes 59 are formed at substantially equal intervals over the entire area of the partition plates 55a, 55b, and 55c.

In the turbine stationary blade 43, when cooling air (a cooling medium) is supplied from a cooling pathway, the cooling air is first introduced inside the blade main body 44, namely, inside the partition plates 55. Then, the cooling air inside the partition plates 55 next is injected through the large number of through-holes 59 formed in the partition plates 55 into the cavity 58, where the cooling air performs impingement cooling of an inner wall surface of the blade main body 44. After that, the cooling air in the cavity 58 is discharged through the large number of cooling holes 52 to the outside (a combustion gas pathway). The cooling air flows along an outside wall surface of the blade main body 44, a suction-side profile 45 and a pressure-side profile 46 and thus performs membrane cooling (film cooling) of the outside wall surface.

Next, the cooling holes (through-holes) 52 will be described. The cooling holes 52 are formed in the blade main body 44, as described above. Here, on the blade main body 44, a protective film 72 is formed on the surface of a substrate 70. The protective film 72 is provided on a region in which the cooling holes 52 are not formed in the surface of the blade main body 44. The protective film 72 is a film provided with a function to protect the surface of the substrate 70, and is, for example, formed of a TBC. By arranging the protective film 72 on the blade main body 44, it is possible to improve durability of the surface thereof and it is thus possible to enhance the durability thereof as the turbine stationary blade.

The cooling hole 52 includes a circular cylindrical portion 62 inclined from the interior of the blade main body 44 with respect to the surface thereof (the surface on which the protective film is formed), and an end of the circular cylindrical portion 62 on the surface side is formed as an opening 63. A central axis 62a of the circular cylindrical portion 62 is inclined with respect to a direction orthogonal to the surface. In the cooling hole 52, the opening 63 has an expanded portion 66 formed on the downstream side of the cooling air flowing from the interior of the blade main body 44 to the surface thereof, namely, at the end on the side which is inclined with respect to a perpendicular line of the inclined circular cylindrical portion 62.

As illustrated in FIG. 6A and FIG. 6B, in the expanded portion 66, a plane is formed so that an angle formed with the direction orthogonal to the surface is larger than that of the circular cylindrical portion 62, namely, so that the inclination of the plane becomes more gradual. The plane of the expanded portion 66 is a flat surface. Furthermore, as illustrated in FIG. 6B, the opening portion of the expanded portion 66 has a shape of which the width becomes larger as the distance from the opening 63 increases.

Since, in the turbine stationary blade 43, the cooling hole 52 has the shape in which the circular cylindrical portion 62 and the expanded portion 66 are connected, it is possible to easily flow the cooling air, which is discharged from the interior of the blade main body 44 to the surface, along the surface of the blade main body 44.

Figure 7:
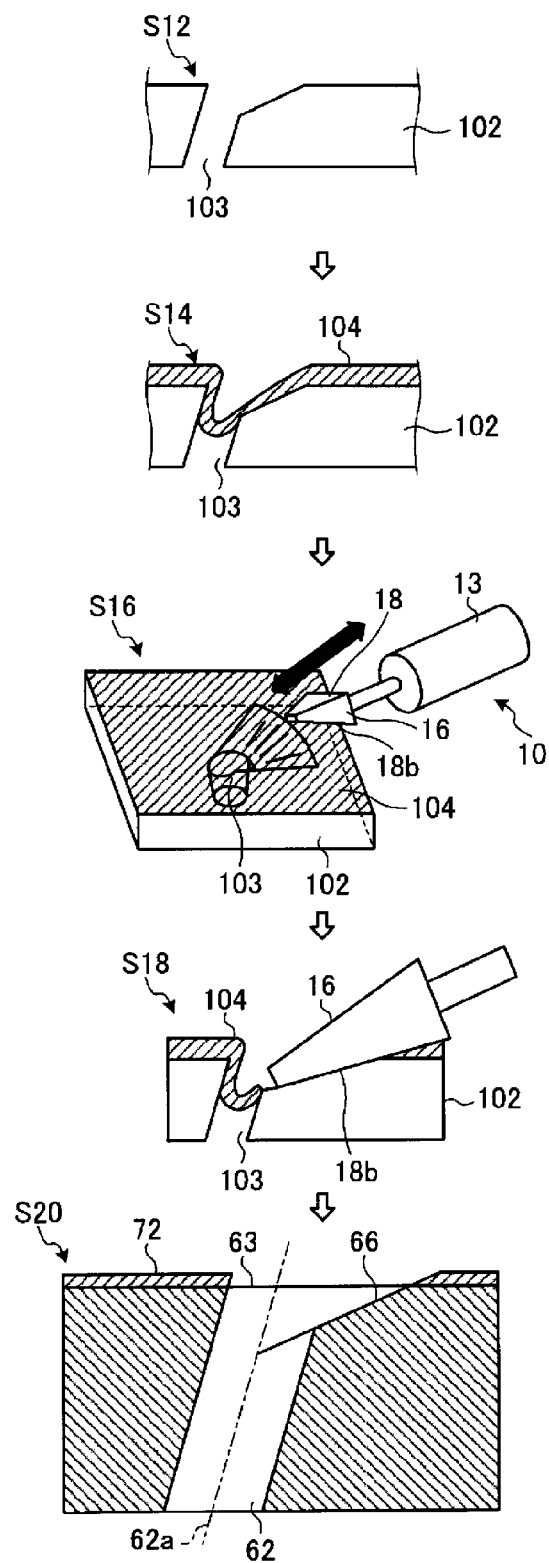
FIG. 7 is an explanatory view describing an example of a machining method of the turbine blade.

Next, with reference to FIG. 7, a machining method of the turbine blade, specifically, a method of machining the cooling hole of the turbine stationary blade as the above-described cooling hole will be described. FIG. 7 is an explanatory view illustrating an example of a machining method of the turbine blade.

As illustrated in step S12, in the machining method of the present embodiment, a substrate 102 is created in which a through-hole 103 that is a cooling hole is formed. Then, as illustrated in step S14, a protective film 104 is formed on the surface of the substrate 102. Here, the protective film 104 can be formed on the surface of the substrate 102 by thermal spraying, for example. At this time, in the machining method, in order to form the protective film 104 evenly over the surface of the substrate 102, the protective film 104 is also formed on a region overlapping the through-hole 103.

Next, as illustrated in step S16, in the machining method, the tip portion 16 of the machining tool 10 is inserted into the region in which the through-hole 103 is formed (an insertion step). At this time, the tip portion 16 is inserted with such an orientation that the bottom surface 18b (the grinding surface) of the grinding region 18 of the tip portion 16 faces the through-hole 103 (the protective film 104 overlapping the through-hole 103). In the machining method, when the tip portion 16 is inserted, the oscillating portion 13 oscillates the tip portion 16. At that time, the oscillation may be caused before the insertion, or may be caused after the insertion. In the machining method, as illustrated in step S18, the protective film 104 overlapping the through-hole 103 is ground and removed by oscillating the tip portion 16 with the oscillating portion 13 while the grinding region 18 of the tip portion 16 is brought into contact with the protective film 104 overlapping the through-hole 103 (a removal step).

In the machining method, by removing the protective film 104 overlapping the through-hole 103 with the machining tool 10, it is possible to create the turbine stationary blade on which the protective film 72 is formed in positions that do not overlap with the opening 63 and the expanded portion 66 of the circular cylindrical portion 62, as illustrated in step S20.

As described above, in the machining method of the present embodiment, by grinding with the machining tool 10, the protective film 104 overlapping the through-hole 103 is removed, and thus it is possible to efficiently achieve a state in which the cooling hole 52 is not covered by the protective film 72.

Furthermore, since the grinding surface of the machining tool 10 has a shape that is flat and tapered, conforming to the shape of the through-hole 103, it is possible to make the through-hole 103 and the grinding surface substantially parallel to each other. It is thus possible, at the time of machining, to inhibit the grinding surface from coming into contact with the through-hole 103 and cutting away the through-hole 103. In addition, as it is possible to widen a range of the through-hole 103 that can be simultaneously machined, it is possible to shorten the time for removing the protective film 104.

Furthermore, as described above, by moving the grinding surface in the extending direction, it is possible to move the grinding surface along a direction of inclination (the tapered shape) of the through-hole 103. In this manner, it is possible to inhibit the grinding surface from coming into contact with the side walls and the like of the through-hole 103.

In the machining method, as in the present embodiment, it is possible to efficiently perform the machining while protecting the substrate 102 of the cooling hole 52, and it is thus preferable to use the machining tool 10 having the above-described shape, specifically, in which the grinding surface has a planar shape and a tapered shape. However, the machining tool 10 is not limited to this example. The tool that grinds the protective film can have a variety of shapes. For example, a tool main body in which the tip portion has a circular columnar or conical shape may be used, or a tool main body in which the tip portion has a flat plate shape may be used. In addition, tool main bodies having a variety of shapes may be combined.

Next, another example of a machining method will be described with reference to FIG. 8. Note that, of processing illustrated in FIG. 8, a detailed description is omitted of steps that are the same as those illustrated in FIG. 7.

Figure 8:
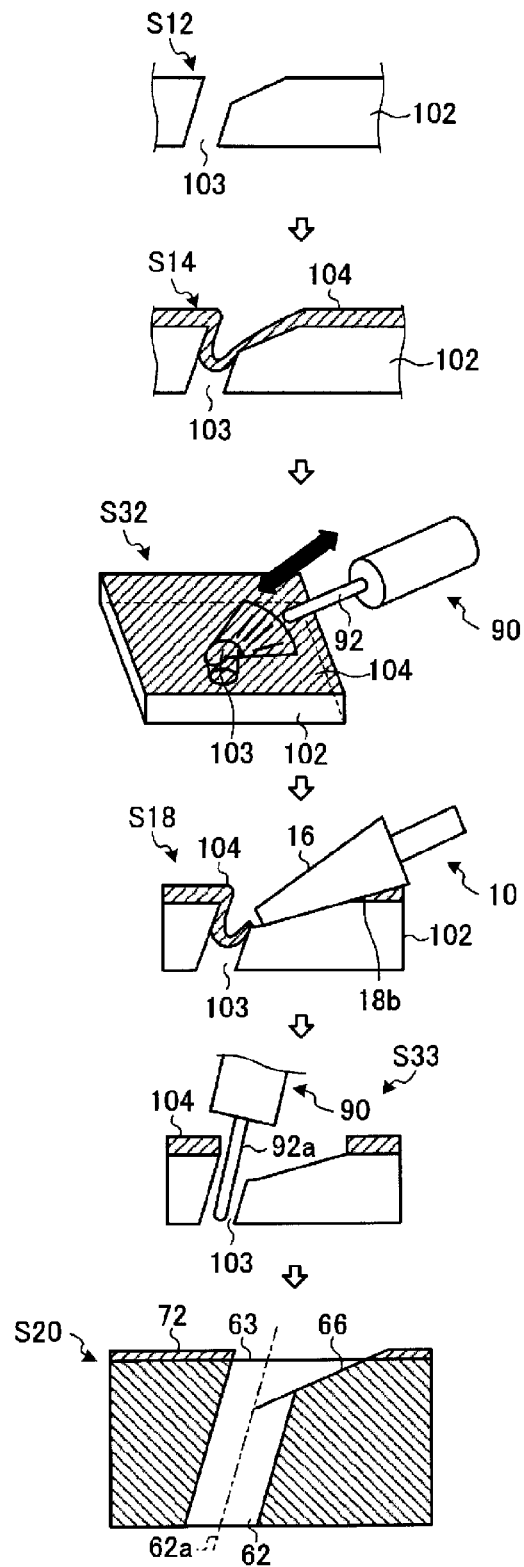
FIG. 8 is an explanatory view describing another example of the machining method of the turbine blade.

In the machining method illustrated in FIG. 8, as illustrated in step S12, the substrate 102 is created in which the through-hole 103 that is the cooling hole is formed. As illustrated in step S14, the protective film 104 is formed on the surface of the substrate 102.

Next, in the machining method, as illustrated in step S32, the protective film 104 overlapping the through-hole 103 is ground and partially removed by inserting a tip portion 92 of a machining tool 90 into a region in which the through-hole 103 is formed and oscillating the tip portion 92, with an oscillating portion, while bringing a grinding region of the tip portion 92 into contact with the protective film 104 overlapping the through-hole 103 (a pretreatment step). Here, in the machining tool 90, the grinding region of the tip portion 92 has a circular columnar shape. Furthermore, the machining tool 90 need not necessarily oscillate the tip portion 92, and may instead use a rotating device, such as a portable grinder, to rotate the tip portion 92.

Next, as illustrated in step S18, in the machining method, the tip portion 16 is inserted with such an orientation that the bottom surface 18b of the grinding region 18 of the tip portion 16 of the machining tool 10 faces the through-hole 103, and the protective film 104 is ground and removed by oscillating the tip portion 16, with the oscillating portion 13, while the grinding region 18 is brought into contact with the protective film 104 overlapping the through-hole 103, namely, by reciprocating the bottom surface 18b of the grinding region 18 in an insertion direction (the insertion step and the removal step).

Next, as illustrated in step S33, the protective film 104 overlapping the through-hole 103 is ground and removed by inserting a tip portion 92a of the machining tool 90 into a region in which the through-hole 103 is formed, more specifically, into a region in which the circular cylindrical portion is formed, and by oscillating the tip portion 92, with an oscillating portion, while bringing a grinding region of the tip portion 92a into contact with the protective film 104 overlapping the through-hole 103 (a post-treatment step). The tip portion 92a has a circular columnar shape in which the grinding region has a smaller diameter than the circular cylindrical portion. In the machining method, by inserting the tip portion 92a into the circular cylindrical portion and by grinding and removing the protective film 104 overlapping the through-hole 103, it is possible to more reliably remove the protective film 104 adhering to the interior of the circular cylindrical portion.

In the machining method, using the machining tools 10 and 90 in this manner to remove the protective film 104 overlapping the through-hole 103, it is possible to create the turbine stationary blade on which the protective film 72 is formed in positions that do not overlap with the opening 63 and the expanded portion 66 of the circular cylindrical portion 62, as illustrated in step S20.

In the machining method illustrated in FIG. 8, it is possible to remove (roughly process) the protective film 104 overlapping the through-hole 103 with the machining tool 90, remove the protective film 104 overlapping a region corresponding to the expanded portion which has a flat surface with the machining tool 10, and remove the protective film 104 adhering to the circular cylindrical portion with the machining tool 90. In this manner, it is possible to efficiently and highly accurately remove the protective film 104 from the cooling hole. Furthermore, by dividing the removal of the protective film 104 into a plurality of steps, it is possible to use a tool suitable for machining each part. In this manner, it is possible to perform the machining while inhibiting grinding of the through-hole 103.

Furthermore, in the turbine blade manufactured by performing the machining with the above-described machining tool, or in the turbine blade manufactured by performing the machining by the above-described machining method, the through-hole such as the cooling hole is formed with a higher accuracy and thus it is possible to enhance the performance of the through-hole. In this manner, it is possible to enhance the performance of the turbine blade. More specifically, on the turbine blade, the protective film 104 such as a thermal spray film is removed while inhibiting a negative impact on the interior of the through-hole 103. By forming the protective film 104 appropriately in this manner, it is possible to improve durability and to remove the protective film 104 with a high degree of accuracy while maintaining the shape of the through-hole 103. It is thus possible to enhance the cooling performance in a case where the through-hole 103 is used as a cooling hole.

REFERENCE SIGNS LIST

10 Machining tool
12, 22 Tool main body
13 Oscillating portion
14, 24 Support portion
16, 26 Tip portion
18, 28 Grinding region
18a Top surface
18b Bottom surface (grinding surface)
18c Side surface
18d Tip
43 Turbine stationary blade (turbine blade)
44 Blade main body
52 Cooling hole (through-hole)
70 Substrate
72 Protective film
102 Substrate
103 Through-hole
104 Protective film

The invention claimed is:

1. A turbine blade machining method of machining a through-hole in a turbine blade, a protective film being formed on a surface of a substrate of the turbine blade, the machining method comprising:
    an insertion step of inserting a first machining tool, comprising a grinding region provided at a tip thereof, into the through-hole with such an orientation that the grinding region faces the surface of the through-hole;
    a removal step of grinding the protective film laminated in the through-hole with the grinding region of the first machining tool inserted into the through-hole, to remove the protective film laminated in the through-hole; and
    a pretreatment step of, before the insertion step, inserting a rod-shaped second machining tool, comprising a grinding region provided at a tip thereof, into the through-hole with such an orientation that the grinding region faces the surface of the through-hole, and grinding the protective film by bringing the grinding region of the second machining tool inserted into the through-hole into contact with the protective film while rotating the grinding region to remove a portion of the protective film laminated in the through-hole.

2. The turbine blade machining method according to claim 1, wherein the grinding region of the first machining tool has a shape conforming to a shape of the through-hole as seen from the surface of the substrate.

3. The turbine blade machining method according to claim 2, wherein the grinding region of the first machining tool is formed on at least one surface of a pyramid shape tapered toward the tip.

4. The turbine blade machining method according to claim 1, wherein the removal step comprises grinding the protective film with the grinding region by oscillating the first machining tool with an oscillating portion.

5. The turbine blade machining method according to claim 4, wherein the oscillating portion reciprocates the grinding region in a direction of insertion into the through-hole.

6. The turbine blade machining method according to claim 1, further comprising a post-treatment step of, after the removal step, inserting the rod-shaped second machining tool into the through-hole with such an orientation that the grinding region faces the surface of the through-hole, and grinding the protective film laminated in the through-hole with the grinding region of the second machining tool inserted into the through-hole to remove the protective film laminated in the through-hole.

7. The turbine blade machining method according to claim 1, wherein the protective film is formed on the surface of the substrate by thermal spraying.

8. The turbine blade machining method according to claim 1, wherein diamond particles are bonded to the grinding region of the first machining tool.

9. A turbine blade machining method of machining a through-hole in a turbine blade, a protective film being formed on a surface of a substrate of the turbine blade, the machining method comprising:
- an insertion step of inserting a first machining tool, comprising a grinding region provided at a tip thereof, into the through-hole with such an orientation that the grinding region faces the surface of the through-hole;
- a removal step of grinding the protective film laminated in the through-hole with the grinding region of the first machining tool inserted into the through-hole, to remove the protective film laminated in the through-hole; and
- a post-treatment step of, after the removal step, inserting a rod-shaped second machining tool, comprising a grinding region provided at a tip thereof, into the through-hole with such an orientation that the grinding region faces the surface of the through-hole, and grinding the protective film laminated in the through-hole with the grinding region of the second machining tool inserted into the through-hole to remove the protective film laminated in the through-hole.

10. The turbine blade machining method according to claim 9, wherein the grinding region of the first machining tool has a shape conforming to a shape of the through-hole as seen from the surface of the substrate.

11. The turbine blade machining method according to claim 10, wherein the grinding region of the first machining tool is formed on at least one surface of a pyramid shape tapered toward the tip.

12. The turbine blade machining method according to claim 9, wherein the removal step comprises grinding the protective film with the grinding region by oscillating the first machining tool with an oscillating portion.

13. The turbine blade machining method according to claim 12, wherein the oscillating portion reciprocates the grinding region in a direction of insertion into the through-hole.

14. The turbine blade machining method according to claim 9, wherein the protective film is formed on the surface of the substrate by thermal spraying.

15. The turbine blade machining method according to claim 9, wherein diamond particles are bonded to the grinding region of the first machining tool.

* * * * *